Oct. 20, 1953  N. EINHORN  2,655,721
ADJUSTABLE PROFILE SCRAPER
Filed Dec. 6, 1949
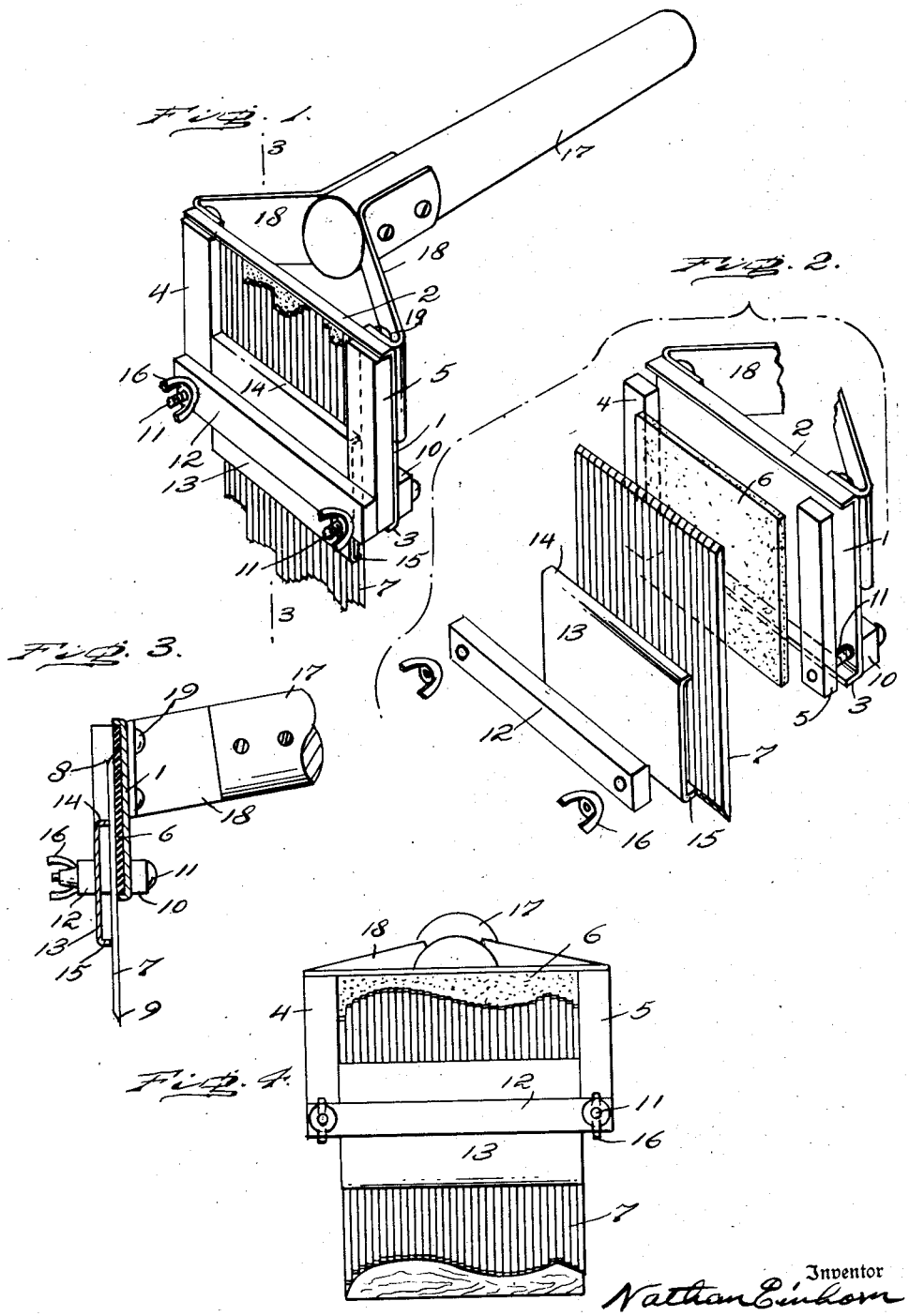
Inventor
Nathan Einhorn
By
Herbert S. Fairbanks
Attorney Patented Oct. 20, 1953

2,655,721

UNITED STATES PATENT OFFICE 2,655,721

ADJUSTABLE PROFILE SCRAPER

Nathan Einhorn, Philadelphia, Pa.

Application December 6, 1949, Serial No. 131,361

2 Claims. (Cl. 30—171)

The object of this invention is to devise a novel scraper in which the scraping elements are in the form of needles, rods or bars of relatively small dimension in cross section, so that they can readily and quickly be adjusted to conform to a selected profile.

A further object of the invention is to devise a scraper having a multiplicity of scraping elements having any desired contour in cross section, and novel mechanism for clamping them in a selected position on a carrying head adapted for manual operation.

A further object of the invention is to provide a novel construction and arrangement of a head or body portion having resilient means to engage the scraping elements; a novel construction and arrangement of a clamping plate; and novel clamping means cooperating with the clamping plate.

With the foregoing and other objects in view as will hereinafter clearly appear, my invention comprehends a novel profile scraper having the scraping elements adjustable to provide a scraping edge conforming to a selected irregular surface such as for example a strip of molding.

It further comprehends a novel head, novel scraping elements and novel mechanism for securing such elements in selected positions in the head.

For the purpose of illustrating the invention, I have shown in the accompanying drawings a preferred embodiment of it which I have found in practice to give satisfactory and reliable results. It is, however, to be understood that the various instrumentalities of which the invention consists can be variously arranged and organized and the invention is not limited to the exact arrangement and organization of these instrumentalities as herein set forth.

Figure 1 is a perspective view of an adjustable profile scraper, embodying my invention.

Figure 2 is an exploded view of the component parts.

Figure 3 is a section on line 3—3 of Figure 1.

Figure 4 is a front elevation.

Similar numerals of reference indicate corresponding parts.

Referring to the drawings:

The body portion 1 of the scraper is in the form of a plate having an outwardly deflected top flange 2 and an outwardly deflected bottom flange 3. Guide bars 4 and 5 are fixed in any desired manner to the front face of the plate near opposite marginal portions. The front face of the plate has a friction strip, for example a strip of rubber 6, secured to it by suitable adhesive, and this strip frictionally engages scraping elements 7 which may have any desired contour in cross section. These scraping elements are in the form of needles, rods or bars which preferably have opposite ends bevelled as at 8 and 9.

The plate near its lower end is reinforced by a cross bar 10 carrying screws 11 which extend through the plate and the guides and through a clamping bar 12 to which latter a flanged clamping plate 13 is fixed. The clamping plate has a top flange 14 which presses the scraping elements towards the friction strip, and also has a bottom flange 15 which contacts the scraping elements at points below the bottom of the plate 1.

The screws are provided with thumb nuts 16. A handle 17 is secured by arms 18 having fastening devices 19 which engage the body portion.

In the operation, the thumb nuts are loosened to release the scraping elements and the operator moves the scraping elements forwardly. The scraping elements are pressed against the molding or other irregular surface to be scraped, and the scraping elements at their forward portions assume the contour of the molding or other irregular surface. The thumb nuts are tightened and the scraper is ready for the particular scraping operation for which it has been adjusted.

During the operation of adjusting the positions of the scraping elements, the operator presses against the clamping bar or clamping plate.

The scraping elements may be sharpened or bevelled at the ends of one or both sides, so that, if one end becomes dull, the element can be reversed to present a new scraping edge. The scraping elements can be circular or non-circular in contour and in many cases I have found that excellent results are obtained if they are rectangular in cross section.

The term "bar" used in the claims is intended to include needles, rods and blades arranged in lateral alignment.

Having thus described my invention, what I claim and desire to secure by Letters Patent is:

1. In a profile scraper, a body portion in the form of a plate having its top and bottom marginal portions forwardly deflected, guide bars fixed to opposite side marginal portions of the front face of the plate, scraping elements in alignment between the guide bars and extending below the bottom edge of the plate of the body portion, a clamping plate between the guide bars and having a top flange contacting the scraping elements above the bottom edge of the body portion plate and having a bottom flange contacting the scraping elements below the bottom edge of the body portion plate, a cross bar connected with the clamping plate, and fastening devices connected with the body portion plate, the guide bars and the cross bar to maintain the scraping elements in clamped condition.

2. The construction defined in claim 1 wherein the scraping elements have their opposite ends bevelled.

NATHAN EINHORN.

References Cited in the file of this patent

UNITED STATES PATENTS

| Number | Name | Date |
|---|---|---|
| 821,525 | Nordquist | May 22, 1906 |
| 854,725 | Devers | May 28, 1907 |
| 1,017,774 | Leavitt | Feb. 20, 1912 |
| 1,906,657 | Stowell | May 2, 1933 |
| 1,968,242 | Birch | July 31, 1934 |
| 2,173,700 | Skarsten | Sept. 19, 1939 |
| 2,379,863 | Caldwell | July 10, 1945 |